(12) United States Patent
Yamamoto

(10) Patent No.: US 10,540,807 B2
(45) Date of Patent: Jan. 21, 2020

(54) IMAGE PROCESSING DEVICE

(71) Applicant: AISIN SEIKI KABUSHIKI KAISHA, Kariya-shi, Aichi-ken (JP)

(72) Inventor: Kinji Yamamoto, Anjo (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 0 days.

(21) Appl. No.: 16/107,146

(22) Filed: Aug. 21, 2018

(65) Prior Publication Data

US 2019/0088006 A1 Mar. 21, 2019

(30) Foreign Application Priority Data

Sep. 15, 2017 (JP) .................................. 2017-177932

(51) Int. Cl.
*G06T 15/20* (2011.01)
*H04N 7/18* (2006.01)
*G03B 37/04* (2006.01)

(52) U.S. Cl.
CPC ............ *G06T 15/205* (2013.01); *G03B 37/04* (2013.01); *H04N 7/181* (2013.01); *B60R 2300/605* (2013.01); *B60R 2300/607* (2013.01)

(58) Field of Classification Search
None
See application file for complete search history.

(56) References Cited

U.S. PATENT DOCUMENTS

| | | | |
|---|---|---|---|
| 6,504,535 B1* | 1/2003 | Edmark .................. | G06T 15/10 345/419 |
| 6,593,960 B1* | 7/2003 | Sugimoto ............... | B60R 11/04 348/142 |
| 7,161,616 B1* | 1/2007 | Okamoto .................. | B60R 1/00 348/148 |
| 7,307,655 B1* | 12/2007 | Okamoto ........... | G06K 9/00791 348/222.1 |
| 8,576,285 B2* | 11/2013 | Gomi ........................ | B60R 1/00 348/113 |
| 9,508,189 B2* | 11/2016 | Han .......................... | B60R 1/00 |
| 9,679,359 B2* | 6/2017 | Huebner .................. | B60R 1/00 |
| 9,767,561 B2* | 9/2017 | Liu ............................ | G06T 7/33 |
| 10,127,463 B2* | 11/2018 | Fursich ................ | H04N 13/239 |

(Continued)

FOREIGN PATENT DOCUMENTS

JP 3300334 B2 7/2002
JP 5292874 B2 9/2013

*Primary Examiner* — Fernando Alcon
(74) *Attorney, Agent, or Firm* — Sughrue Mion, PLLC

(57) ABSTRACT

An image processing device includes: an acquisition unit that acquires an image by imaging surroundings of a vehicle; a generation unit that projects the image onto a three-dimensional projection plane including the vehicle at a first time point and a first projection area rising above the vehicle, and generates a composite image seen on the plane from a virtual viewpoint; a calculation unit that calculates a moving route of the vehicle from the first time point to a second time point on the plane; a change unit that changes a projection destination of at least a part of the moving route in the first projection area to a second projection area; and a display control unit that displays the composite image on the plane that includes the vehicle at the first time point, and the first and second projection areas seen from the virtual viewpoint on a display unit.

5 Claims, 9 Drawing Sheets

(56) References Cited

U.S. PATENT DOCUMENTS

| | | | | |
|---|---|---|---|---|
| 10,140,775 B2* | 11/2018 | Oba | ................. | G06T 3/4038 |
| 10,210,597 B2* | 2/2019 | Scholl | ................. | G06T 3/0018 |
| 2003/0085999 A1* | 5/2003 | Okamoto | ................. | B60R 1/00 |
| | | | | 348/148 |
| 2010/0134325 A1* | 6/2010 | Gomi | ................. | B60R 1/00 |
| | | | | 340/995.14 |
| 2011/0175752 A1* | 7/2011 | Augst | ................. | B60R 1/00 |
| | | | | 340/905 |
| 2011/0234801 A1* | 9/2011 | Yamada | ................. | B60R 1/00 |
| | | | | 348/148 |
| 2011/0243454 A1* | 10/2011 | Miyajima | ................. | G01C 21/28 |
| | | | | 382/195 |
| 2012/0068840 A1* | 3/2012 | Ozaki | ................. | B60R 1/00 |
| | | | | 340/456 |
| 2014/0063197 A1* | 3/2014 | Yamamoto | ................. | G08G 1/166 |
| | | | | 348/46 |
| 2014/0152774 A1* | 6/2014 | Wakabayashi | ................. | G08G 1/168 |
| | | | | 348/46 |
| 2014/0152827 A1* | 6/2014 | Yamamoto | ................. | G06K 9/00791 |
| | | | | 348/148 |

* cited by examiner

EXPAND TWO-DIMENSIONAL PROJECTION AREA

IMAGE PROCESSING DEVICE

CROSS REFERENCE TO RELATED APPLICATIONS

This application is based on and claims priority under 35 U.S.C. § 119 to Japanese Patent Application 2017-177932, filed on Sep. 15, 2017, the entire contents of which are incorporated herein by reference.

TECHNICAL FIELD

Embodiments disclosed here relate to an image processing device.

BACKGROUND DISCUSSION

A technology has been developed, in which a captured image obtained by capturing an image of surroundings of a vehicle is projected onto a three-dimensional projection plane, and a composite image seen on the projection plane from a virtual viewpoint is displayed. Japanese Patent No. 5292874 (Reference 1) and Japanese Patent No. 3300334 (Reference 2) are examples of the related art.

However, in the three-dimensional projection plane, if the flat projection plane on which the vehicle is included is narrow, a moving route of the vehicle is not projected onto the flat projection plane, and the lane boundary line or the like which makes it possible to specify the moving route of the vehicle is distorted. On the other hand, if the flat projection plane is too wide, obstacles around the vehicle are also projected onto the flat projection plane, and thus, the obstacles will be distorted and an uncomfortable composite image is displayed.

SUMMARY

As an example, an image processing device according to an aspect of this disclosure includes: an acquisition unit that acquires a captured image obtained by imaging surroundings of the vehicle by an imaging unit mounted on the vehicle; a generation unit that projects the captured image onto a three-dimensional projection plane including the vehicle at a first time point and a first projection area rising above the vehicle, and generates a composite image seen on the three-dimensional projection plane from a virtual viewpoint; a calculation unit that calculates a moving route of the vehicle from the first time point to a second time point after the first time point on the three-dimensional projection plane according to a travel state of the vehicle; a change unit that changes a projection destination of at least a part of the moving route in the first projection area to a second projection area that is horizontal with respect to the vehicle, while holding an area in the first projection area other than the moving route in the first projection area; and a display control unit that displays the composite image on the three-dimensional projection plane that includes the vehicle at the first time point, the first projection area, and the second projection seen from the virtual viewpoint on a display unit, the composite image being a result of changing performed by the change unit.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an example of a state in which a part of a cabin of a vehicle equipped with an image processing device according to a first embodiment is seen through;

DETAILED DESCRIPTION

Hereinafter, the exemplary embodiments described here will be disclosed below. Configurations of the embodiments described below, and the actions, results, and effects brought about by the configurations are just examples. This disclosure can be realized by a configuration other than the configuration disclosed in the following embodiments, and at least one effect can be obtained from various effects based on the basic configuration and derived effects.

A vehicle on which an image processing device according to this embodiment is mounted may be an automobile (internal combustion engine vehicle) driven by an internal combustion engine (engine), or a vehicle (an electric automobile, a fuel cell automobile, or the like) driven by an electric motor, or an automobile (a hybrid automobile) driven by both the internal combustion engine and the electric motor. In addition, the vehicle can be equipped with various transmission devices, various devices (systems, parts, and the like) necessary for driving the internal combustion engine and electric motor. In addition, the type, the number, the layout, or the like of the devices related to the driving of the wheels in the vehicle can be variously set.

First Embodiment

Figure 1:
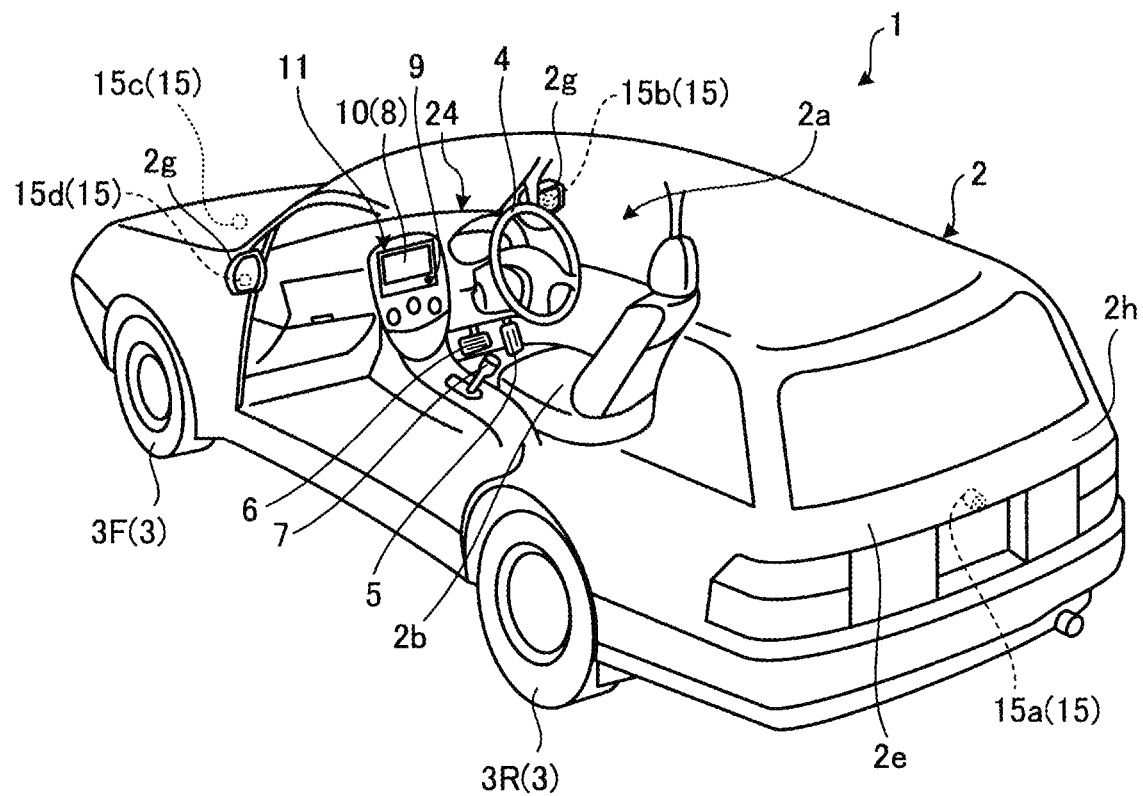

FIG. 1 is a perspective view illustrating an example of a state in which a part of a cabin of a vehicle equipped with an image processing device according to a first embodiment is seen through. As illustrated in FIG. 1, a vehicle 1 includes a vehicle body 2, a steering section 4, an acceleration operation section 5, a braking operation section 6, a transmission shift operation section 7, and a monitor device 11. The vehicle body 2 includes a cabin 2a in which the occupants are on board. In the cabin 2a, the steering section 4, the acceleration operation section 5, the braking operation section 6, the transmission shift operation section 7, and the like are provided in a state where a driver is seated on a seat 2b as the occupant. The steering section 4 is, for example, a steering wheel protruding from a dashboard 24. The acceleration operation section 5 is, for example, an accelerator pedal positioned under the driver's feet. The braking operation section 6 is, for example, a brake pedal positioned under the feet of the driver. The transmission shift operation section 7 is, for example, a shift lever protruding from a center console.

The monitor device 11 is provided, for example, at the center portion in the vehicle width direction (that is, the lateral direction) of the dashboard 24. The monitor device 11 may have a function of a navigation system or an audio system for example. The monitor device 11 includes a display device 8, an audio output device 9, and an operation input section 10. The monitor device 11 may also include various operation input sections such as switches, dials, joysticks, pushbuttons and the like.

The display device 8 is configured to include a liquid crystal display (LCD), an organic electroluminescent display (OLED) and the like, and can display various images based on image data. The audio output device 9 is configured to include a speaker or the like, and outputs various voices based on audio data. The audio output device 9 may be provided at a position in the cabin 2a different from the position of the monitor device 11.

The operation input section 10 is configured to include a touch panel or the like, and makes it possible for the occupant to input various information items. In addition, the operation input section 10 is provided on a display screen of the display device 8 and can transmit the image displayed on the display device 8. In this way, the operation input section 10 makes it possible for the occupant to visually recognize the image displayed on the display screen of the display device 8. The operation input section 10 receives the input of various information items from the occupant by detecting the touch operation of the occupant on the display screen of the display device 8.

Figure 2:
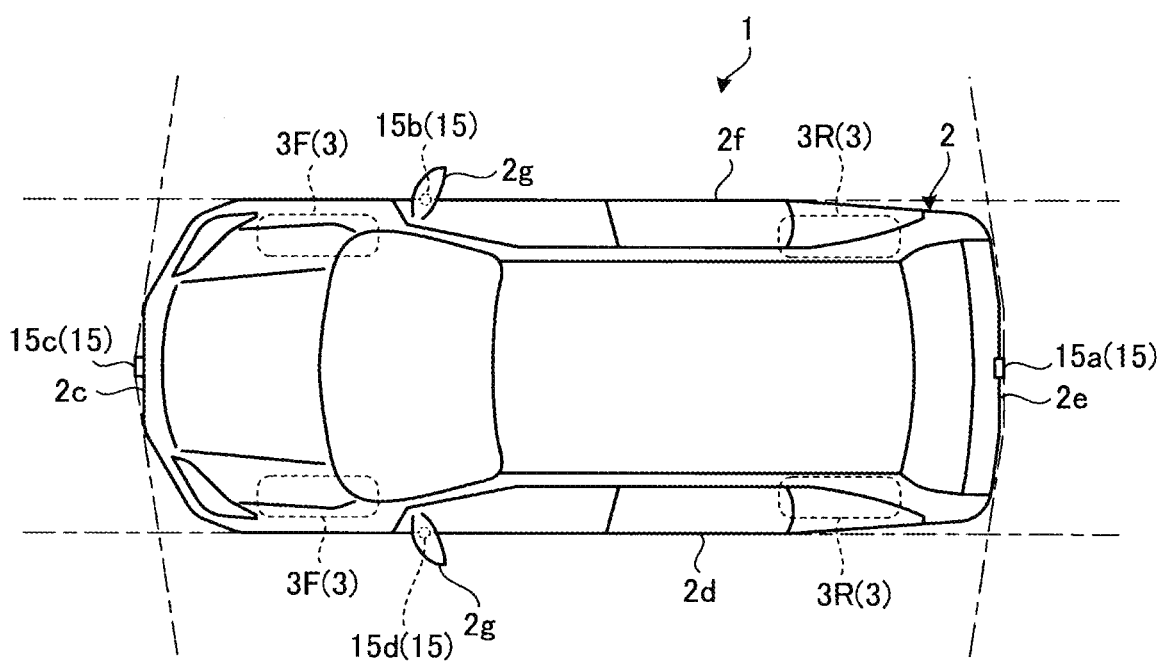
FIG. 2 is a plan view of an example of a vehicle according to the first embodiment.

FIG. 2 is a plan view of an example of a vehicle according to the first embodiment. As illustrated in FIG. 1 and FIG. 2, the vehicle 1 is a four-wheeled vehicle or the like, and includes two left and right front vehicle wheels 3F and two left and right rear vehicle wheels 3R. All or a part of the four vehicle wheels 3 can be steered.

The vehicle 1 is equipped with a plurality of imaging units 15. In this embodiment, for example, the vehicle 1 is equipped with four imaging units 15a to 15d. The imaging unit 15 is a digital camera including an image capturing device such as a charge coupled device (CCD) or a CMOS image sensor (CIS). The imaging unit 15 can image the surroundings of the vehicle 1 at a predetermined frame rate.

Then, the imaging unit 15 outputs the captured image obtained by imaging the surroundings of the vehicle 1. The imaging unit 15 includes a wide-angle lens or a fish-eye lens and can capture an image in a range of 140° to 220°, for example, in the horizontal direction. In addition, in some cases, an optical axis of the imaging unit 15 may be set obliquely downward.

Specifically, the imaging unit 15a is positioned, for example, at an end portion 2e at the rear side of the vehicle body 2, and is provided on the wall portion of a rear hatch door 2h below the rear window. The imaging unit 15a can image the area behind the vehicle 1 among the surroundings of the vehicle 1. The imaging unit 15b is, for example, positioned at an end portion 2f at the right side of the vehicle body 2, and is provided on the right side door mirror 2g. The imaging unit 15b can image the area in the side direction of the vehicle 1 among the surroundings of the vehicle 1. The imaging unit 15c is positioned, for example, at the front side of the vehicle body 2, that is, at an end portion 2c at the front side in the longitudinal direction of the vehicle 1, and is provided on a front bumper, a front grill, or the like. The imaging unit 15c can image the area in front of the vehicle 1 among the surroundings of the vehicle 1. The imaging unit 15d is positioned, for example, at the end portion 2d at the left side of the vehicle body 2, that is, at the left side of the vehicle width direction, and is provided on the left side door mirror 2g. The imaging unit 15d can image the area at the side of the vehicle 1 among the surroundings of the vehicle 1.

Figure 3:
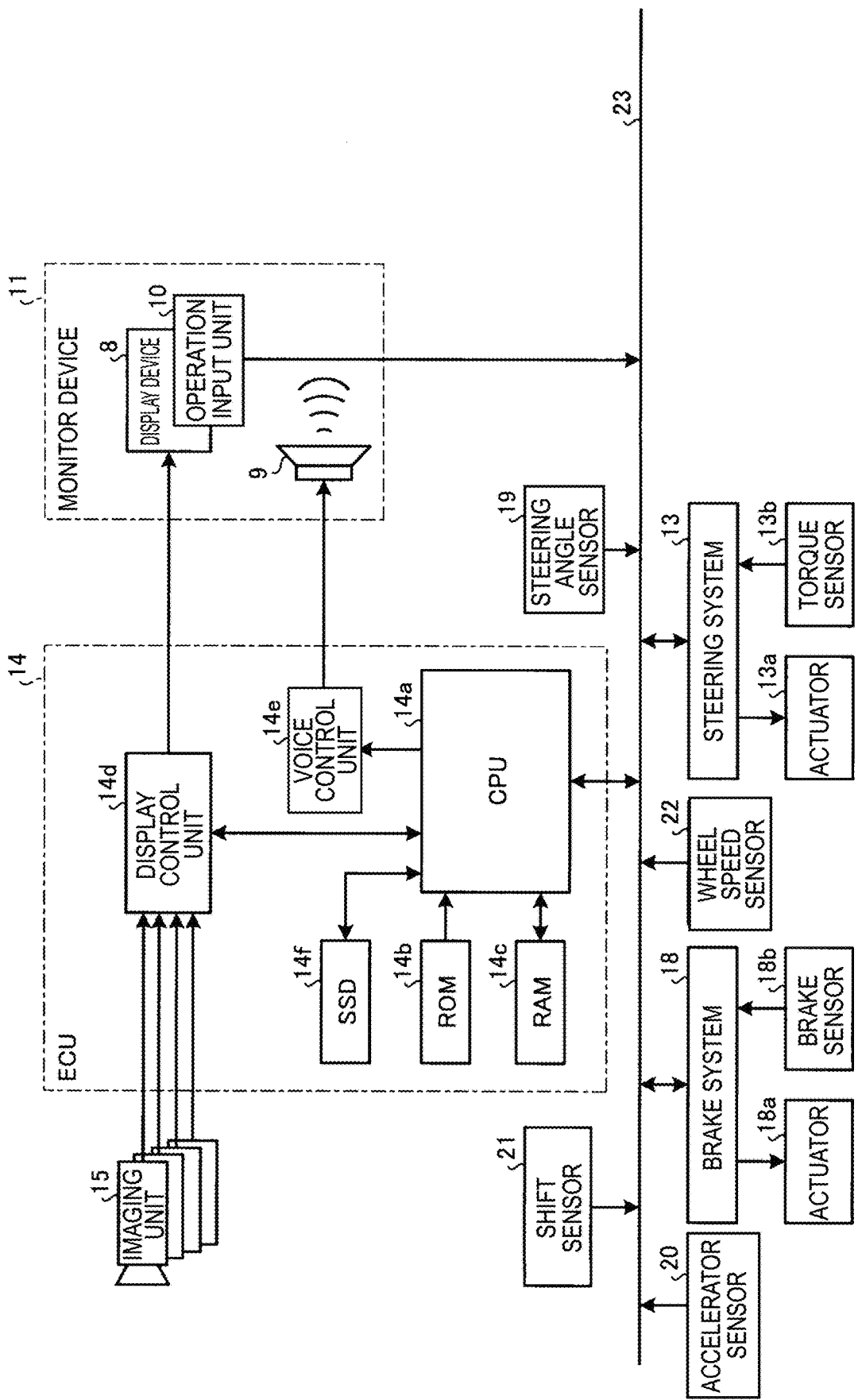
FIG. 3 is a block diagram illustrating an example of a functional configuration of the vehicle according to the first embodiment.

FIG. 3 is a block diagram illustrating an example of a functional configuration of the vehicle according to the first embodiment. As illustrated in FIG. 3, the vehicle 1 includes a steering system 13, a brake system 18, a steering angle sensor 19, an accelerator sensor 20, a shift sensor 21, a wheel speed sensor 22, an in-vehicle network 23, and electronic control unit (ECU) 14. The monitor device 11, the steering system 13, the brake system 18, the steering angle sensor 19, the accelerator sensor 20, the shift sensor 21, the wheel speed sensor 22 and the ECU 14 are electrically connected to each other via the in-vehicle network 23 which is a telecommunication line. The in-vehicle network 23 is configured with a controller area network (CAN) or the like.

The steering system 13 is an electric power steering system, a steer by wire (SBW) system, or the like. The steering system 13 includes an actuator 13a and a torque sensor 13b. The steering system 13 is electrically controlled by the ECU 14 or the like, operates the actuator 13a, and steers the vehicle wheels 3 by adding torque to the steering section 4 to supply the steering force. The torque sensor 13b detects the torque applied by the driver to the steering section 4, and transmits the result of detection to the ECU 14.

The brake system 18 includes an anti-lock brake system (ABS) that controls the brake lock of the vehicle 1, a side slip prevention device (an electronic stability control (ESC)) that suppresses the side slip of the vehicle 1 during cornering, an electric power brake system that assists the brake system by increasing the brake force, and a brake by wire (BBW). The brake system 18 includes an actuator 18a and a brake sensor 18b. The brake system 18 is electrically controlled by the ECU 14 or the like, and applies the braking force to the vehicle wheels 3 via the actuator 18a. The brake system 18 detects the brake lock, idling of the vehicle wheels 3, signs of side slip, or the like from the difference in rotation between the left and right vehicle wheels 3, or the like, and then, performs a control to suppress the brake lock, the idling of the vehicle wheels 3, and the side slip. The brake sensor 18b is a displacement sensor that detects the position of the brake pedal as a movable section of the braking operation section 6, and transmits the detection result of the position of the brake pedal to the ECU 14.

The steering angle sensor 19 is a sensor that detects a steering amount of a steering section 4 such as a steering wheel. In this embodiment, the steering angle sensor 19 is configured with a Hall element or the like, detects the rotation angle of the rotating portion of the steering section 4 as a steering amount, and then, transmits the detection result to the ECU 14. The accelerator sensor 20 is a displacement sensor that detects the position of the accelerator pedal as a movable section of the acceleration operation section 5, and transmits the detection result to the ECU 14.

The shift sensor 21 is a sensor that detects the position of the movable section (bar, arm, button, and the like) of the transmission shift operation section 7, and transmits the detection result to the ECU 14. The wheel speed sensor 22 includes a Hall element and the like and is a sensor that detects the rotation amount of the vehicle wheels 3 and the number of rotations of the vehicle wheels 3 per a unit time, and transmits the detection result to the ECU 14.

The ECU 14 functions as an example of an image processing device that projects a captured image obtained by imaging the surroundings of the vehicle 1 by the imaging unit 15 onto a projection plane set in advance, generates an image of the projection plane seen from the virtual viewpoint, displays the generated image on the display device 8. In addition, the ECU 14 can perform an autonomous driving control to cause the vehicle 1 to autonomously travel in accordance with a route set in advance regardless of the driving operation of the user. Here, in the autonomous driving control, the steering section 4, the braking operation section 6, the acceleration operation section 5, and the like are controlled such that the current position of the vehicle 1, the lane in which the vehicle 1 travels, the position of other vehicles around the vehicle 1 are occasionally detected, and the vehicle 1 travels along the route set in advance based on the result of detection. The ECU 14 is configured as a computer or the like, and causes cooperation between hardware and software to perform overall management of controlling the vehicle 1. Specifically, the ECU 14 includes a central processing unit (CPU) 14a, a read only memory (ROM) 14b, a random access memory (RAM) 14c, a display control unit 14d, a voice control unit 14e, and a solid state drive (SSD) 14f. The CPU 14a, the ROM 14b, and the RAM 14c may be provided on the same circuit board.

The CPU 14a reads the program stored in a nonvolatile storage device such as the ROM 14b and performs various arithmetic processing items according to the program. For example, the CPU 14a performs image processing on image data to be displayed on the display device 8, calculation of a distance to an obstacle existing around the vehicle 1, and the like.

The ROM 14b stores various programs and parameters necessary for executing the program. The RAM 14c temporarily stores various data items used in the calculation performed by the CPU 14a. Among the calculation processing items performed by the ECU 14, the display control unit 14d mainly performs the image processing on the image data acquired from the imaging unit 15 and output to the CPU 14a, and performs conversion of the image data acquired from the CPU 14a into the image data for display to be displayed on the display device 8. Among the calculation processing items performed by the ECU 14, the voice control unit 14e mainly performs the voice processing for acquiring the voice from the CPU 14a and outputting the voice to the audio output device 9. The SSD 14f is a rewritable nonvolatile storage unit, and continues to store the data acquired from the CPU 14a even when the power source of the ECU 14 is turned off.

Figure 4:
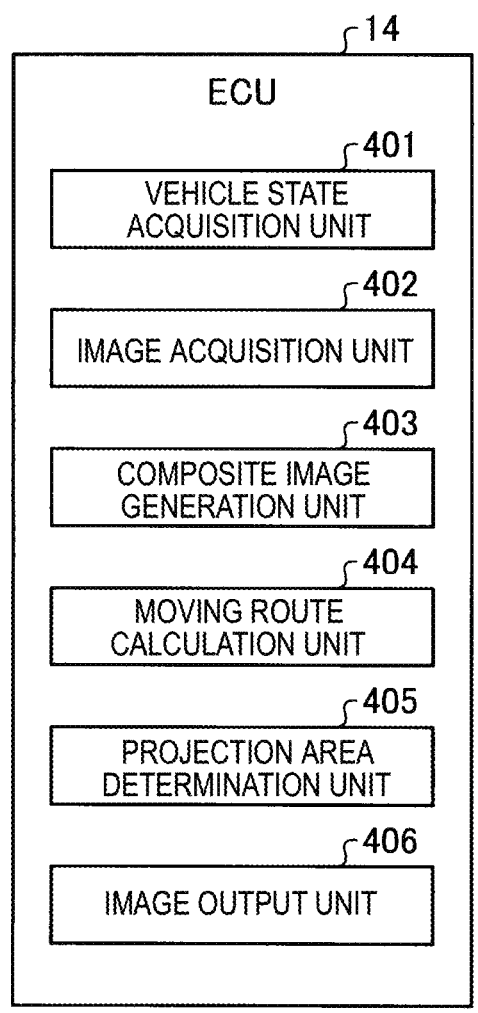
FIG. 4 is a block diagram illustrating an example of a functional configuration of an ECU included in the vehicle according to the first embodiment.

FIG. 4 is a block diagram illustrating an example of a functional configuration of the ECU included in the vehicle according to the first embodiment. As illustrated in FIG. 4, the ECU 14 includes a vehicle state acquisition unit 401, an image acquisition unit 402, a composite image generation unit 403, a moving route calculation unit 404, a projection area determination unit 405, and an image output unit 406. For example, the ECU 14 performs functions of the vehicle state acquisition unit 401, the image acquisition unit 402, the composite image generation unit 403, the moving route calculation unit 404, the projection area determination unit 405, and the image output unit 406 by executing a surroundings monitoring program stored in a storage medium such as the ROM 14b or the SSD 14f using a processor such as the CPU 14a mounted on a circuit board. A part or all of the vehicle state acquisition unit 401, the image acquisition unit 402, the composite image generation unit 403, the moving route calculation unit 404, the projection area determination unit 405, and the image output unit 406 may be configured with hardware such as a circuit.

The vehicle state acquisition unit 401 acquires a travel state of the vehicle 1 such as the steering amount of the steering section 4 detected by the steering angle sensor 19, the position of the accelerator pedal detected by the accelerator sensor 20, the position of the movable section of the transmission shift operation section 7 detected by the shift sensor 21, the number of rotations of the vehicle wheels 3 detected by the wheel speed sensor 22. The image acquisition unit 402 acquires a captured image from the imaging unit 15, which is obtainable by imaging the surroundings of the vehicle 1 using the imaging unit 15.

The composite image generation unit 403 projects the captured image obtained by the image acquisition unit 402 onto a three-dimensional projection plane (hereinafter, referred to as a three-dimensional projection plane). Here, the three-dimensional projection plane includes a vehicle 1 at a first time point (for example, a current time point) and a three-dimensional projection area rising above the vehicle 1. In this embodiment, the three-dimensional projection plane includes a projection area including the vehicle 1 at the first time point and being horizontal to the vehicle 1 (hereinafter, referred to as a two-dimensional projection area) and a three-dimensional projection area positioned around the two-dimensional projection area. The composite image generation unit 403 generates an image (hereinafter, referred to as a composite image) of the three-dimensional projection plane on which the captured image is projected, which is seen from the virtual viewpoint.

The image output unit 406 functions as an example of a display control unit that outputs the composite image generated by the composite image generation unit 403 to the display device 8 and displays the composite image on the display device 8. The moving route calculation unit 404 calculates a moving route of the vehicle 1 on the three-dimensional projection plane from the first time point to a second time point after the first time point (for example, a time point after a predetermined time after the first time point) according to the travel state of the vehicle 1 acquired by the vehicle state acquisition unit 401. In this embodiment, the moving route calculation unit 404 calculates the moving route of the vehicle 1 when the vehicle 1 is under the autonomous driving control by the ECU 14. However, the moving route of the vehicle 1 during a manual driving in which the vehicle 1 is driven based on the driving operation by the user can also be calculated.

The projection area determination unit 405 functions as a change unit that changes a projection destination of at least a part of the moving route in the three-dimensional projection area to the two-dimensional projection area while holding an area in the three-dimensional projection area other than the moving route in that three-dimensional projection area. In other words, the projection area determination unit 405 changes only the projection destination of at least a part of the moving route in the three-dimensional projection area to the two-dimensional projection area. In this way, a three-dimensional obstacle adjacent to the moving route of the vehicle 1 is projected onto the three-dimensional projection area while projecting the moving route of the vehicle 1 onto the flat two-dimensional projection area, and thus, it is possible to prevent the moving route (for example, the lane line) of the vehicle 1 from being distorted without the obstacle projected onto the three-dimensional projection plane being elongated or not being projected. As a result, the composite image in which the moving route of the vehicle 1 and the surroundings thereof are seen natural can be displayed.

Figure 5:
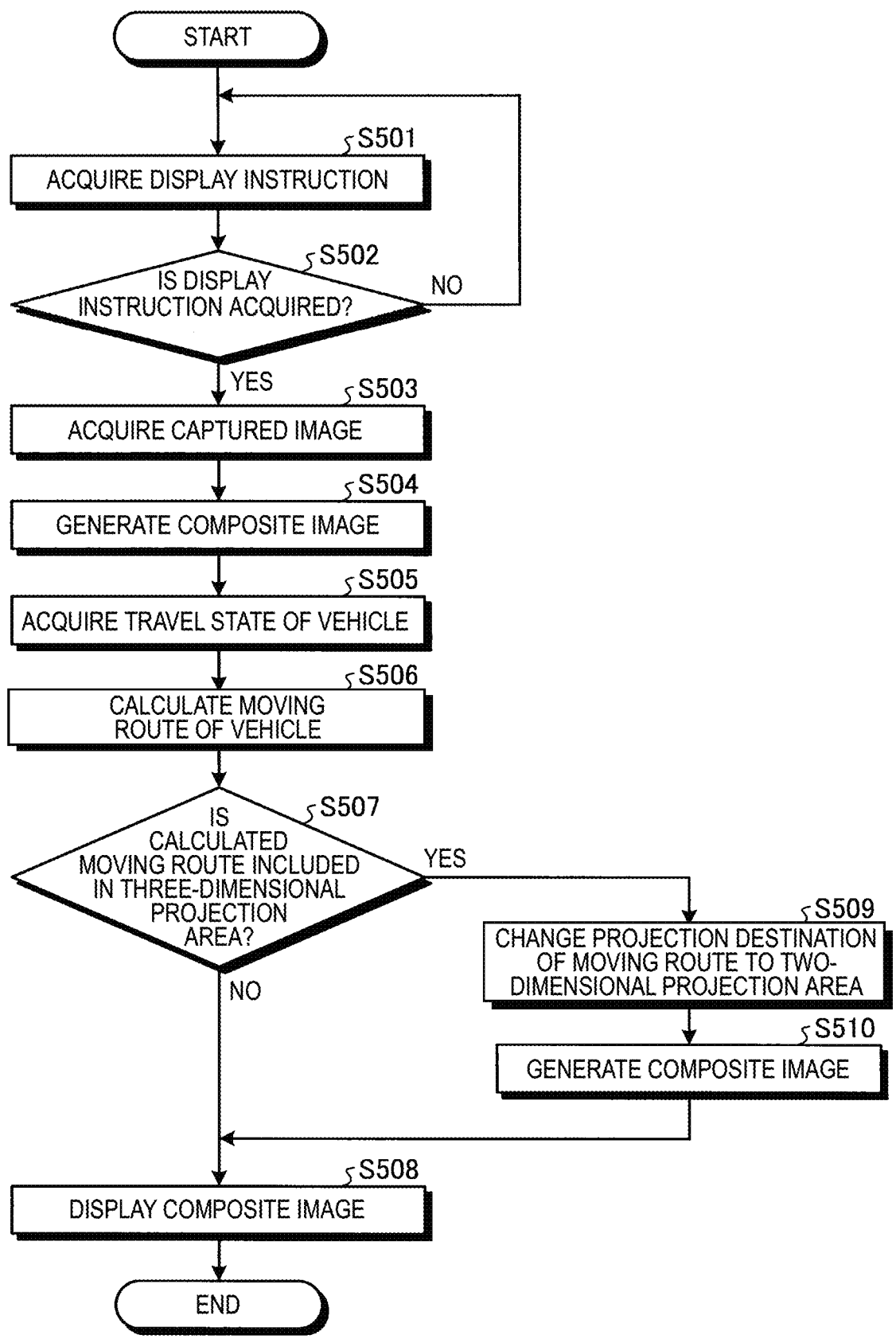
FIG. 5 is a flowchart illustrating an example of a flow of composite image display processing performed by the ECU included in the vehicle according to the first embodiment.

Next, an example of a flow of composite image display processing performed by the ECU 14 included in the vehicle 1 according to this embodiment will be described with reference to FIG. 5. FIG. 5 is a flowchart illustrating the example of the flow of composite image display processing performed by the ECU included in the vehicle according to the first embodiment.

In this embodiment, the vehicle state acquisition unit 401 acquires a display instruction from the operation input section 10 and the like to display the composite image (STEP S501). If the display instruction is acquired (Yes in STEP S202), the image acquisition unit 402 acquires a captured image from the imaging unit 15, which is obtainable by imaging the surroundings of the vehicle 1 at the first time point (STEP S503).

Next, the composite image generation unit 403 projects the acquired captured image onto a three-dimensional projection plane and generates a composite image on the three-dimensional projection plane seen from a virtual viewpoint set in advance (STEP S504). In this embodiment, the composite image generation unit 403 converts coordinates (hereinafter, referred to as texture coordinates) in the acquired captured image into coordinates in the three-dimensional projection plane by a projective transformation. The composite image generation unit 403 projects each image of the texture coordinates in the acquired captured image onto a position represented by the coordinates in the three-dimensional projection plane which is the result of projective transformation from the texture coordinates in the three-dimensional projection plane. As a result, the composite image generation unit 403 projects the acquired captured image onto the three-dimensional projection plane.

The vehicle state acquisition unit 401 acquires the travel state of the vehicle 1 at the first time point (STEP S505). The moving route calculation unit 404 calculates a moving route of the vehicle 1 from the first time point to the second time point in the three-dimensional projection plane according to the travel state of the vehicle 1 at the first time point at which the travel state is acquired (STEP S506). Subsequently, the projection area determination unit 405 determines whether or not the calculated moving route is included in the three-dimensional projection area (STEP S507). If the calculated moving route is not included in the three-dimensional projection area (No in STEP S507), the image output unit 406 directly displays the composite image generated by the composite image generation unit 403 on the display device 8 (STEP S508).

On the other hand, if the calculated moving route is included in the three-dimensional projection area (Yes in STEP S507), the projection area determination unit 405 changes the projection destination of the moving route in the three-dimensional projection area to the two-dimensional projection area while holding the area in the three-dimensional projection area other than the moving route in that three-dimensional projection area (STEP S509). The composite image generation unit 403 re-projects the captured image onto the three-dimensional projection plane which is changed from the three-dimensional projection area, and generates a composite image on the three-dimensional projection plane on which the captured image is re-projected seen from the virtual viewpoint (STEP S510). Thereafter, the image output unit 406 displays the composite image generated by the composite image generation unit 403 on the display device 8 (STEP S508).

Figure 6:
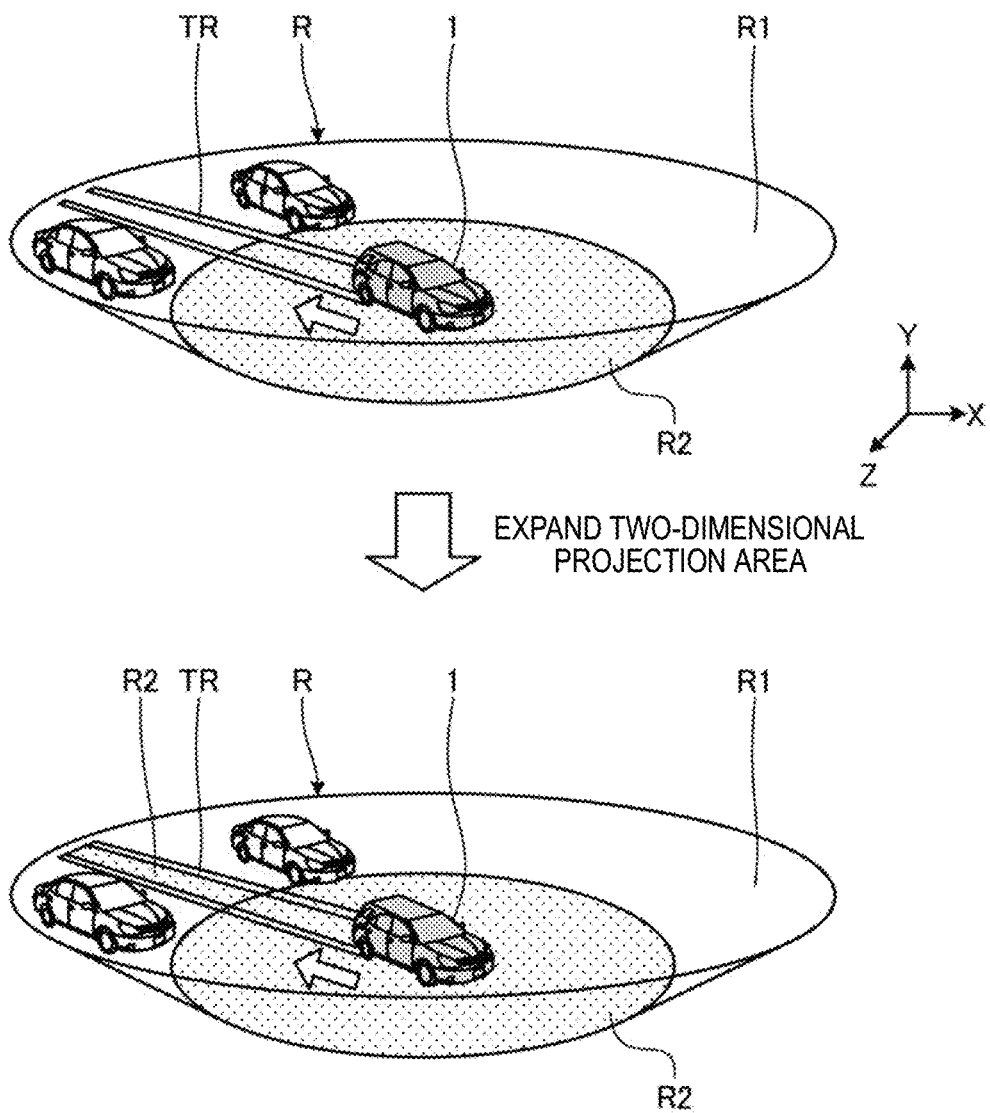
FIG. 6 is a diagram for explaining an example of three-dimensional projection area change processing performed by the ECU of the vehicle according to the first embodiment.

Next, an example of three-dimensional projection area change processing performed by the ECU 14 included in the vehicle 1 according to this embodiment will be described with reference to FIG. 6. FIG. 6 is a diagram for explaining an example of the three-dimensional projection area change processing performed by the ECU of the vehicle according to the first embodiment. In FIG. 6, a direction parallel to the two-dimensional projection area R2 is defined as the Z direction, a direction parallel to the two-dimensional projection area R2 and orthogonal to the Z direction is defined as the X direction, and a direction orthogonal to the two-dimensional projection area R2 is defined as the Y direction.

For example, as illustrated in FIG. 6, the composite image generation unit 403 generates a three-dimensional projection plane R including a three-dimensional projection area R1 and a two-dimensional projection area R2 in advance. The two-dimensional projection area R2 is a projection plane of a circle (a regular circle, an ellipse, or the like) having a center on the position P of the vehicle 1. In this embodiment, the two-dimensional projection area R2 is a circular projection plane, but not limited thereto, and may be, for example, a polygonal projection plane. The three-dimensional projection area R1 is a projection plane that gradually rises in the Y direction (above the vehicle 1) from an end (outer edge) of the two-dimensional projection area R2 as going away from the two-dimensional projection area R2 with the two-dimensional projection area R2 as a reference. Specifically, the three-dimensional projection area R1 is a curved surface rising from the outer edge of the two-dimensional projection area R2 in an elliptical or parabolic shape in the Y direction. That is, the composite image generation unit 403 generates a bowl-shaped three-dimensional plane including the position P of the vehicle 1, as the three-dimensional projection plane R. Subsequently, the composite image generation unit 403 projects the captured image acquired by the image acquisition unit 402 onto the generated three-dimensional projection plane R.

In addition, as illustrated in FIG. 6, the moving route calculation unit 404 calculates a moving route TR from the first time point to the second time point of the vehicle 1 on the three-dimensional projection plane R. Subsequently, as illustrated in FIG. 6, if the calculated moving route TR is included in the three-dimensional projection area R1, the projection area determination unit 405 partially enlarges (expands) the two-dimensional projection area R2 such that the moving route TR in the three-dimensional projection area R1 is included in the two-dimensional projection area R2. At that time, the projection area determination unit 405 holds the area other than the moving route TR in the three-dimensional projection area R1 in the three-dimensional projection area R1. In this way, it is possible to prevent the moving route TR (for example, lane line) of the vehicle 1 from being distorted without the obstacles projected onto the three-dimensional projection plane R being elongated or not projected. Therefore, the composite image in which the moving route TR of the vehicle 1 and the surroundings thereof are seen natural can be displayed. In the example illustrated in FIG. 6, the projection area determination unit 405 changes the projection destination of the entire moving route TR in the three-dimensional projection area R1 to the two-dimensional projection area R2, but not limited thereto as long as at least a part of the moving route TR included in the three-dimensional projection area R1 is changed to the two-dimensional projection area R2.

Figure 7:
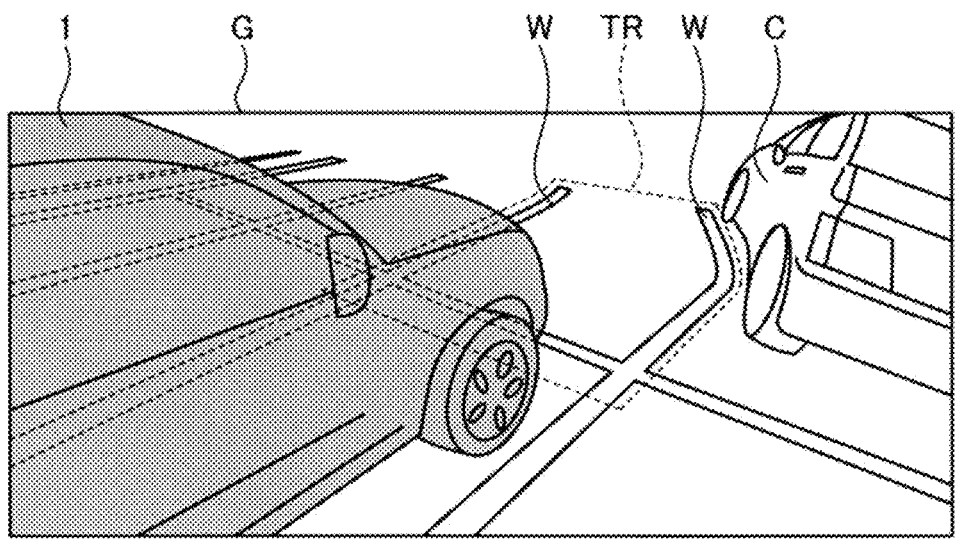
FIG. 7 is a diagram illustrating an example of a composite image displayed by the ECU included in the vehicle according to the first embodiment.
Figure 8:
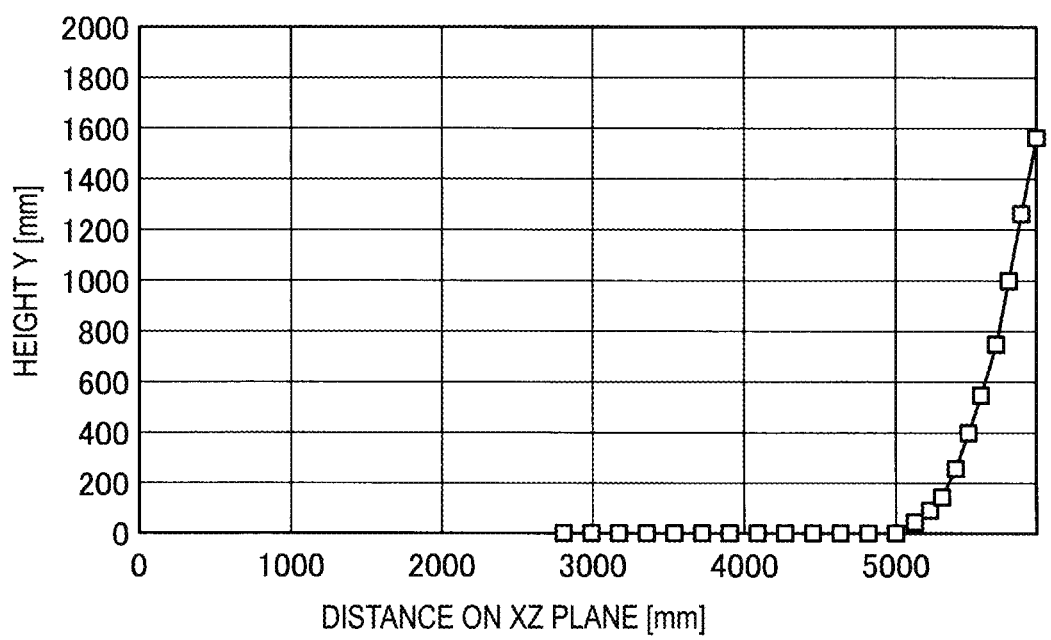
FIG. 8 is an example of a cross-sectional view of a three-dimensional projection plane on which a captured image is projected by the ECU included in the vehicle according to the first embodiment.
Figure 9:
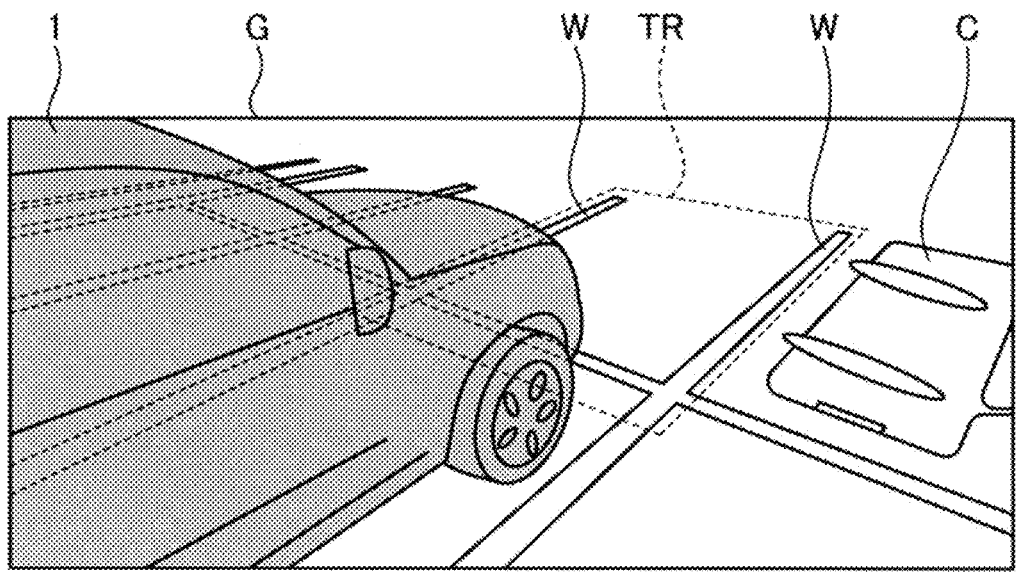
FIG. 9 is a diagram illustrating an example of a composite image displayed by the ECU included in the vehicle according to the first embodiment.
Figure 10:
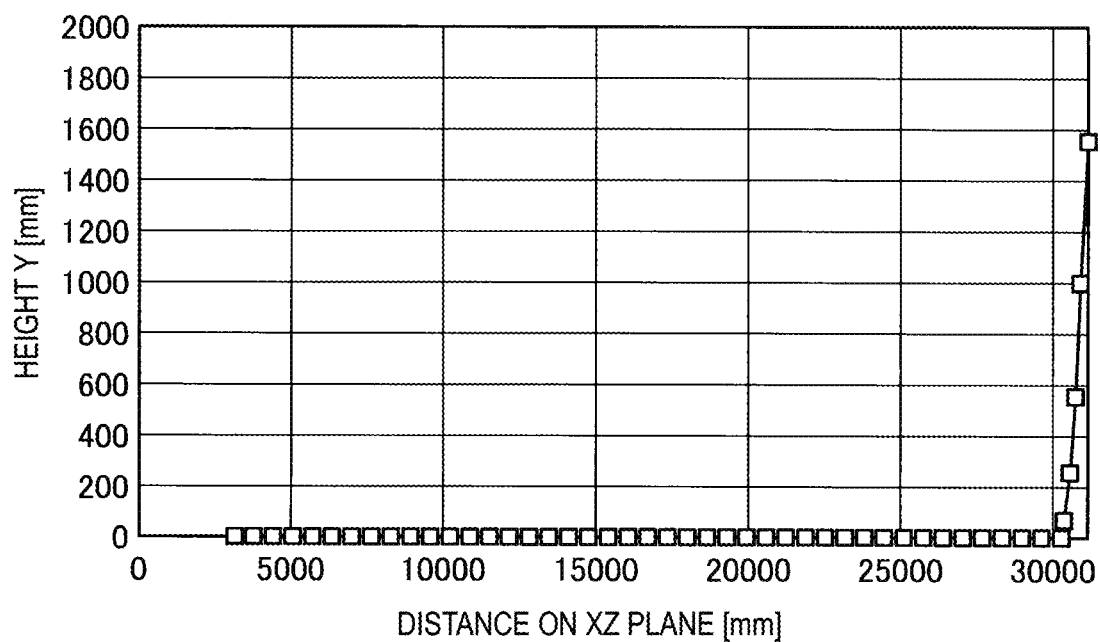
FIG. 10 is an example of a cross-sectional view of a three-dimensional projection plane on which a captured image is projected by the ECU included in the vehicle according to the first embodiment.
Figure 11:
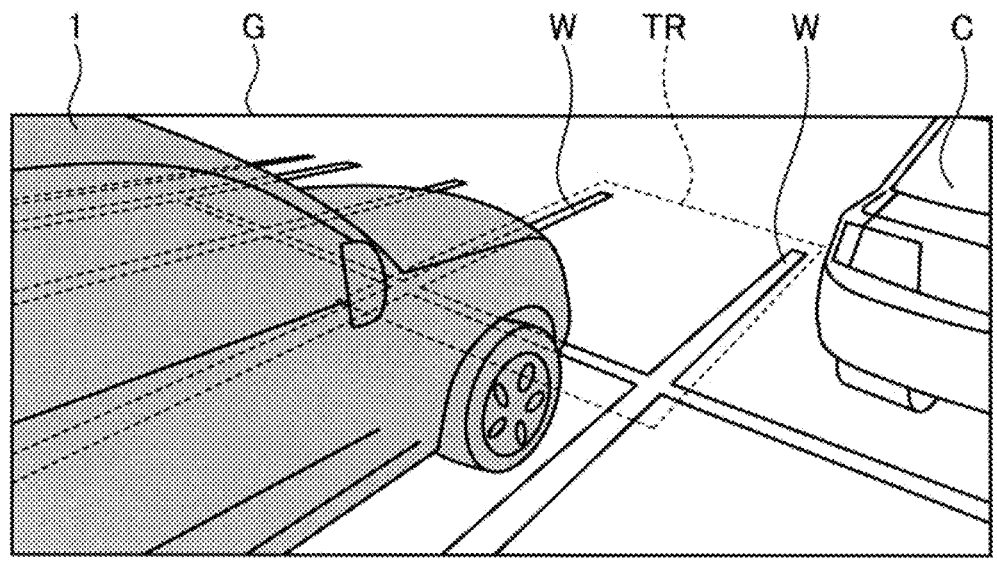
FIG. 11 is a diagram illustrating an example of a composite image displayed by the ECU included in the vehicle according to the first embodiment.
Figure 12:
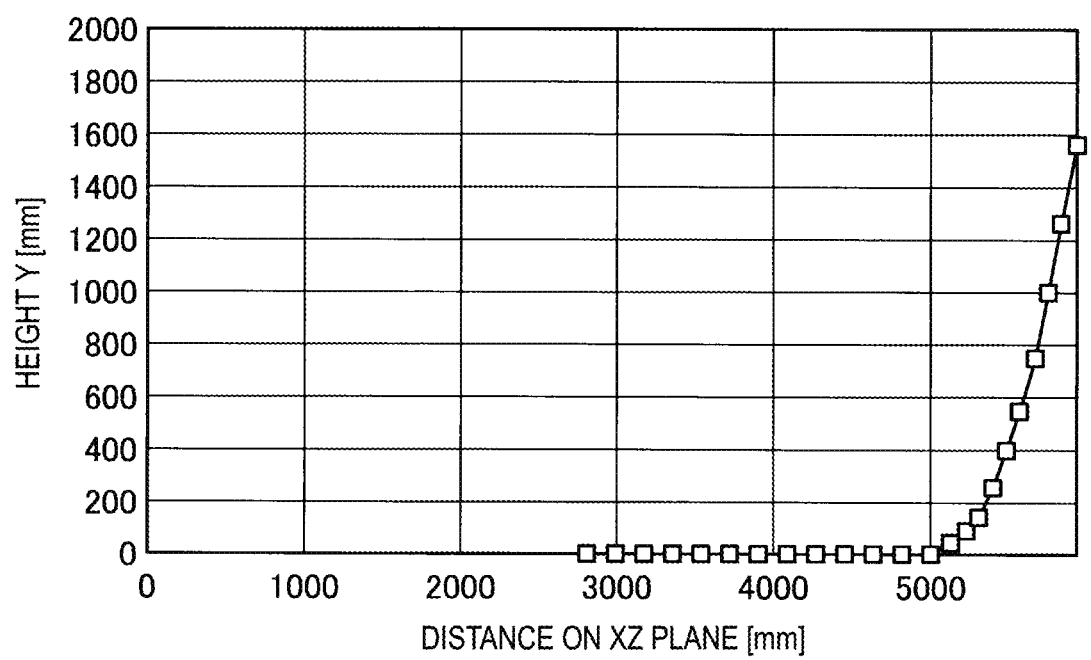
FIG. 12 is an example of a cross-sectional view of a three-dimensional projection plane on which a captured image is projected by the ECU included in the vehicle according to the first embodiment.

Next, examples of composite images displayed by the ECU 14 included in the vehicle 1 according to this embodiment will be described with reference to FIG. 7 to FIG. 12. FIG. 7, FIG. 9, and FIG. 11 are diagrams illustrating the examples of composite images displayed by the ECU included in the vehicle according to the first embodiment. FIG. 8, FIG. 10, and FIG. 12 are examples of cross-sectional view of three-dimensional projection planes that project captured images by the ECU included in the vehicle according to the first embodiment. In FIG. 8, FIG. 10, and FIG. 12, the horizontal axis represents the distance from the position of the vehicle 1 to each point in the three-dimensional projection plane in the X direction and in the XZ plane parallel to the X direction, and the vertical axis represents the height (that is, the coordinate in the Y direction) of each point on the three-dimensional projection plane.

For example, as illustrated in FIG. 8, the composite image generation unit 403 projects the captured image on a three-dimensional projection plane that includes a circular two-dimensional projection area with a radius of 5000 mm having a center at the position of the vehicle 1 and a three-dimensional projection area rising in a parabolic shape in the Y direction from the outer edge of the two-dimensional projection area. In this case, a three-dimensional object (for example, another vehicle C) around the moving route TR 5000 mm ahead of the position of the vehicle 1 and a moving route TR of the vehicle 1 are projected onto the three-dimensional projection area together. Therefore, as illustrated in FIG. 7, the moving route TR (for example, a lane line W) included in the composite image G displayed on the display device 8 is distorted, and thus, the composite image G in which the moving route TR of the vehicle 1 is seen natural cannot be displayed.

In addition, as illustrated in FIG. 10, the composite image generation unit 403 projects the captured image on a three-dimensional projection plane that includes a circular two-dimensional projection area with a radius of 30000 mm having a center at the position of the vehicle 1 and a three-dimensional projection area rising in a parabolic shape in the Y direction from the outer edge of the two-dimensional projection area. In this case, a three-dimensional object (for example, another vehicle C) around the moving route TR is projected onto the three-dimensional projection area in the three-dimensional projection plane. Therefore, as illustrated in FIG. 9, the moving route TR included in the composite image G displayed on the display device 8 is not distorted, but the image of surroundings of the moving route TR (for example, another vehicle C) is elongated, and thus, the composite image G in which the surroundings of the moving route TR of the vehicle 1 is seen naturally cannot be displayed.

Therefore, as illustrated in FIG. 12, in the three-dimensional projection area that includes the circular two-dimensional projection area with a radius of 5000 mm having a center at the position of the vehicle 1 and the three-dimensional projection area rising in a parabolic shape in the Y direction from the outer edge of the two-dimensional projection area, the determination unit 405 changes the projection destination of only the moving route TR in the three-dimensional projection area to the two-dimensional projection area. In this way, as illustrated in FIG. 11, a three-dimensional object (for example, another vehicle C) adjacent to the moving route TR is projected onto the three-dimensional projection area while projecting captured image of the moving route TR onto the two-dimensional projection area, and thus, it is possible to prevent the moving route TR (for example, the lane line W) of the vehicle 1 from being distorted without the three-dimensional object around the moving route TR projected on the three-dimensional projection plane being elongated or not being projected. As a result, the composite image G in which the moving route TR of the vehicle 1 and the surroundings thereof are seen naturally can be displayed.

In addition, if a three-dimensional object such as another vehicle C exists adjacent to the moving route TR in the two-dimensional projection area, the determination unit 405 may change the position in the two-dimensional projection area at which the three-dimensional object adjacent to the moving route TR is projected, to three-dimensional projection area. Specifically, the projection area determination unit 405 detects the projection position in the two-dimensional projection area at which the three-dimensional object existing around the moving route is projected, based on the captured image acquired by the image acquisition unit 402. Next, the projection area determination unit 405 reduces the two-dimensional projection area such that the detected projection position is included in the three-dimensional projection area. In this way, the three-dimensional objects adjacent to the moving route TR in the two-dimensional projection area are also projected onto the three-dimensional projection area, and thus, it is possible to prevent the image of the three-dimensional object existing around the moving route TR in the two-dimensional projection area from being elongated or not projected. As a result, the composite image G in which the moving route TR of the vehicle 1 and the surroundings of the moving route TR are seen naturally can be displayed.

As described above, according to the vehicle 1 in the first embodiment, a three-dimensional obstacle adjacent to the moving route of the vehicle 1 is projected onto the three-dimensional projection area while projecting the moving route of the vehicle 1 onto the flat two-dimensional projection area, and thus, it is possible to prevent the moving route (for example, the lane line) of the vehicle 1 from being distorted without the obstacle projected onto the three-dimensional projection plane being elongated or not being projected. Therefore, the composite image in which the moving route of the vehicle 1 and the surroundings thereof are seen naturally can be displayed.

Second Embodiment

The present embodiment is an example of projecting a captured image onto a three-dimensional projection plane using a 3D correspondence map that associates coordinates of the three-dimensional projection plane with texture coordinates of the captured image projected on the coordinates are associated, and a 2D map that associates coordinates of the two-dimensional projection plane formed from only the projection plane horizontal to the vehicle with texture coordinates of the captured image projected on the coordinates. In the description below, the configurations same as that of the first embodiment will be described again.

Figure 13:
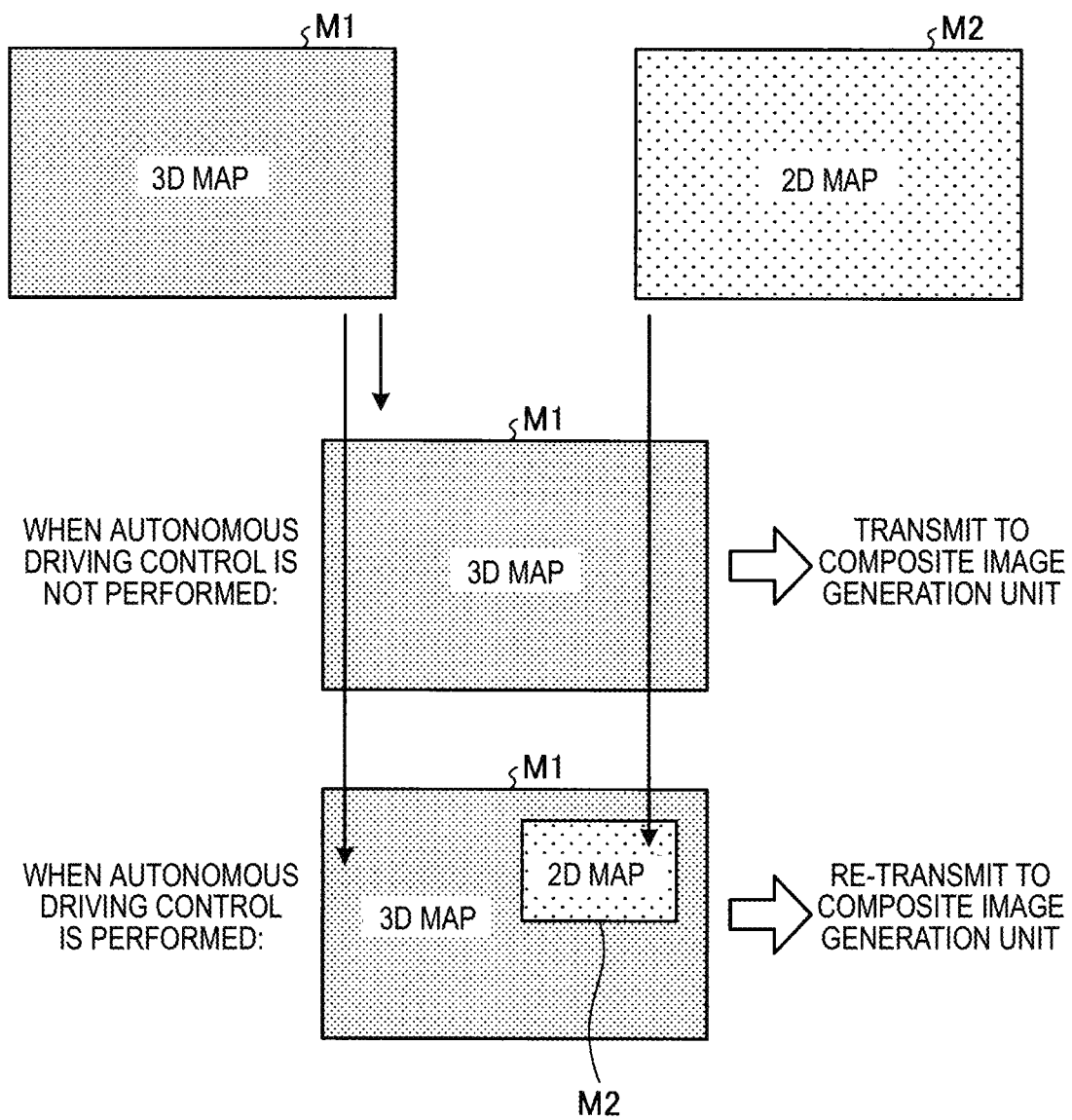
FIG. 13 is a diagram for explaining an example of captured image projection processing in the ECU included in a vehicle according to a second embodiment.

FIG. 13 is a diagram for explaining an example of captured image projection processing in the ECU included in a vehicle according to the second embodiment. In this embodiment, ROM 14*b* is a storage unit that stores 3D map M1 and 2D map M2. Here, the 3D map M1 is a map that associates the coordinates of the three-dimensional projection plane with the texture coordinates of the captured image projected on the coordinates. The 2D map M2 is a map that associates the coordinates of the two-dimensional projection plane formed from only the projection plane horizontal to the vehicle 1 and the texture coordinates of the captured image projected on the coordinates.

In this embodiment, when the moving route is calculated (that is, if the autonomous driving control of the vehicle 1 is performed), the moving route calculation unit 404 the map among the 3D map M1, which associates the coordinates of the moving route in the three-dimensional projection area with the texture coordinates of the captured image projected on the coordinates, with the 2D map M2 that associates the coordinates of moving route in the two-dimensional projection plane with the texture coordinates of the captured image projected on the coordinates. The moving route calculation unit 404 functions as a transmission unit that transmits the 3D map M1 overwritten with the 2D map M2 to the composite image generation unit 403. In addition, in this embodiment, if the moving route is not calculated (that is, if the autonomous driving control of the vehicle 1 is not performed), the moving route calculation unit 404 transmits the 3D map M1 stored in the ROM 14*b* to the composite image generation unit 403 without overwriting with the 2D map M2. In this way, since it becomes unnecessary to calculate the coordinates in the three-dimensional projection plane and the texture coordinates of the captured image projected on the coordinates every time the composite image is displayed, it is possible to speed up the composite image display processing. In addition, even if the projection destination of the moving route in the three-dimensional projection plane is changed, as long as the 3D map M1 is overwritten with the 2D map M2 and then the result is transmitted, it is not necessary to recalculate the coordinates in the three-dimensional projection plane and the texture coordinates of captured image projected on the coordinates. Therefore, it is possible to further speed up the composite image display processing.

In this embodiment, the composite image generation unit 403 projects the captured image acquired by the image acquisition unit 402 onto the three-dimensional projection plane according to the 3D map M1 received from the moving route calculation unit 404. Specifically, for each pixel included in the captured image, the composite image generation unit 403 specifies the coordinates of the three-dimensional projection plane associated with the texture coordinates of the pixel in the 3D map M1. In the three-dimensional projection plane, the composite image generation unit 403 projects the captured image onto the three-dimensional projection plane by projecting the pixel to a position of the specified coordinates.

As described above, according to the vehicle 1 in the second embodiment, since it is not necessary to recalculate the coordinates in the three-dimensional projection plane and the texture coordinates of captured image projected on the coordinates every time the composite image is displayed, it is possible to speed up the composite image display processing.

As an example, an image processing device according to an aspect of this disclosure includes: an acquisition unit that acquires a captured image obtained by imaging surroundings of the vehicle by an imaging unit mounted on the vehicle; a generation unit that projects the captured image onto a three-dimensional projection plane including the vehicle at a first time point and a first projection area rising above the vehicle, and generates a composite image seen on the three-dimensional projection plane from a virtual viewpoint; a calculation unit that calculates a moving route of the vehicle from the first time point to a second time point after the first time point onto the three-dimensional projection plane according to a travel state of the vehicle; a change unit that changes a projection destination of at least a part of the moving route in the first projection area to a second projection area that is horizontal with respect to the vehicle, while holding an area in the first projection area other than the moving route in the first projection area; and a display control unit that displays the composite image on the three-dimensional projection plane that includes the vehicle at the first time point, the first projection area, and the second projection seen from the virtual viewpoint on a display unit, the composite image being a result of changing performed by the change unit. With this configuration, as an example, the image processing device according to the aspect of this disclosure can display the composite image in which the moving route of the vehicle and the surroundings thereof are seen naturally.

In addition, as an example, in the image processing device according to the aspect of this disclosure, the first projection area is positioned around the second projection area, the second projection area includes the vehicle at the first time point, and the change unit partially expands the second projection area such that at least a part of the moving route included in the first projection area is included in the second projection area. With this configuration, as an example, the image processing device according to the aspect of this disclosure can display the composite image in which the moving route of the vehicle and the surroundings thereof are seen naturally.

In addition, as an example, the image processing device according to the aspect of this disclosure further includes a detection unit that detects a projection position of a three-dimensional object existing around the moving route in the second projection area, and the change unit reduces the second projection area such that the projection position is included in the first projection area. With this configuration, as an example, the image processing device according to the aspect of this disclosure can display the composite image in which the moving route of the vehicle and the surroundings thereof are seen further naturally.

In addition, as an example, in the image processing device according to the aspect of this disclosure, the calculation unit calculates the moving route of the vehicle under an autonomous driving control. With this configuration, as an example, the image processing device according to the aspect of this disclosure can display the composite image in which the moving route of the vehicle and the surroundings thereof are seen naturally.

In addition, as an example, the image processing device according to the aspect of this disclosure further includes a storage unit that stores a first map which associates coordinates of the three-dimensional projection plane with texture coordinates of the captured image projected on the coordinates of the three-dimensional projection plane, and a second map which associates coordinates of a two-dimensional projection plane including only a projection plane horizontal to the vehicle with the texture coordinates projected on the coordinates of the two-dimensional projection plane, and if the autonomous driving control is performed, the change unit overwrites a map in the first map, which associates the coordinates of the moving route in the three-dimensional projection plane with the texture coordinates of the captured image projected on the coordinates, with the second map which associates the coordinates of the moving route in the two-dimensional projection plane with the texture coordinates of the captured image projected on the coordinates, and transmits the first map to the generation unit, and the generation unit projects the captured image onto the three-dimensional projection plane according to the first map received from the change unit. With this configuration, image processing device according to the aspect of this disclosure can speed up the composite image display processing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image processing device comprising:
at least one processor configured to
acquire a captured image obtained by imaging surroundings of a vehicle by at least one camera mounted on the vehicle;
project the captured image onto a three-dimensional projection plane including the vehicle at a first time point and a first projection area rising above the vehicle, and generate a composite image seen on the three-dimensional projection plane from a virtual viewpoint;
calculate a moving route of the vehicle from the first time point to a second time point after the first time point on the three-dimensional projection plane according to a travel state of the vehicle;
change a projection destination of at least a part of the moving route in the first projection area to a second projection area that is horizontal with respect to the vehicle, while holding an area in the first projection area other than the moving route in the first projection area; and
display the composite image on the three-dimensional projection plane that includes the vehicle at the first time point, the first projection area, and the second projection seen from the virtual viewpoint on a display, the composite image being a result of the changing of the projection destination of the at least the part of the moving route.

2. The image processing device according to claim 1, wherein the first projection area is positioned around the second projection area,
the second projection area includes the vehicle at the first time point, and
the second projection area is partially expanded such that at least a part of the moving route included in the first projection area is included in the second projection area.

3. The image processing device according to claim 2, wherein the at least one processor is further configured to:
detect a projection position of a three-dimensional object existing around the moving route in the second projection area,
wherein the second projection area is reduced such that the projection position is included in the first projection area.

4. The image processing device according to claim 1, wherein the moving route of the vehicle under an autonomous driving control is calculated.

5. The image processing device according to claim 1, further comprising:
a storage configured to store a first map which associates coordinates of the three-dimensional projection plane with texture coordinates of the captured image projected on the coordinates of the three-dimensional projection plane, and a second map which associates coordinates of a two-dimensional projection plane including only a projection plane horizontal to the vehicle with the texture coordinates projected on the coordinates of the two-dimensional projection plane,
wherein, if the autonomous driving control is performed, a map is overwritten in the first map, which associates the coordinates of the moving route in the three-dimensional projection plane with the texture coordinates of the captured image projected on the coordinates, with the second map which associates the coordinates of the moving route in the two-dimensional projection plane with the texture coordinates of the captured image projected on the coordinates, and
the captured image is projected onto the three-dimensional projection plane according to the first map.

* * * * *